United States Patent
Kelleher et al.

(10) Patent No.: US 11,484,043 B2
(45) Date of Patent: *Nov. 1, 2022

(54) FUNCTIONAL PROTEIN DERIVED FROM ANIMAL MUSCLE TISSUE OR MECHANICALLY DEBONED MEAT AND METHOD FOR MAKING THE SAME

(71) Applicant: KEMIN PROTEINS LLC, Des Moines, IA (US)

(72) Inventors: Stephen D. Kelleher, Ipswich, MA (US); Caitlyn Frost, Wrightsville, GA (US); William R. Fielding, Hilton Head, SC (US)

(73) Assignee: Kemin Proteins LLC, Des Moines, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/589,788

(22) Filed: Oct. 1, 2019

(65) Prior Publication Data

US 2020/0029589 A1 Jan. 30, 2020

Related U.S. Application Data

(63) Continuation of application No. 14/506,615, filed on Oct. 4, 2014, now Pat. No. 10,470,479.

(60) Provisional application No. 61/886,889, filed on Oct. 4, 2013.

(51) Int. Cl.
*A23J 1/02* (2006.01)
*A23L 13/40* (2016.01)

(52) U.S. Cl.
CPC ............... *A23J 1/02* (2013.01); *A23L 13/42* (2016.08)

(58) Field of Classification Search
CPC .................................. A23J 1/02; A23L 13/42
See application file for complete search history.

(56) References Cited

U.S. PATENT DOCUMENTS

| | | | |
|---|---|---|---|
| 3,989,847 A | 11/1976 | Kurihara et al. |
| 6,288,216 B1 | 9/2001 | Hultin et al. |
| 7,956,081 B2 | 7/2011 | Kelleher et al. |
| 10,470,479 B2 | 11/2019 | Kelleher |
| 10,736,339 B2 | 8/2020 | Kelleher |
| 2004/0224079 A1 | 11/2004 | Kelleher |
| 2005/0255228 A1 | 11/2005 | Kelleher |
| 2010/0009048 A1 | 1/2010 | Hultin et al. |
| 2012/0171345 A1 | 5/2012 | Kelleher et al. |
| 2015/0099866 A1 | 4/2015 | Kelleher |
| 2020/0329732 A1 | 10/2020 | Kelleher |

FOREIGN PATENT DOCUMENTS

| | | |
|---|---|---|
| CN | 1751062 A | 3/2006 |
| CN | 101828627 | 9/2010 |
| EP | 0848911 A2 | 6/1998 |
| EP | 0924992 | 10/2001 |
| RU | 2225694 | 7/1998 |
| RU | 2002103868 | 7/2000 |
| WO | WO1993002569 | 2/1993 |
| WO | WO 1999011656 A1 | 11/1999 |
| WO | WO2001005251 | 7/2000 |
| WO | WO2004073415 A2 | 9/2004 |
| WO | WO2015051353 A1 | 4/2015 |
| WO | WO2016100299 A1 | 6/2016 |
| WO | WO2019070602 A1 | 4/2019 |

OTHER PUBLICATIONS

International Preliminary Report on Patentability for PCT/US2018/053792, dated Apr. 16, 2020.
Communication pursuant to Article 94(3) EPC for EP Application No. 14850534 (dated Apr. 1, 2020).
Extended European Search Report for EP Application No. 14850534 (dated May 29, 2017).
International Search Report and Written Opinion dated Dec. 18, 2014, PCT/US2014/059226.
http://www.fao.org/docrep/010/ai407e/AI407E08.htm Heat Treatment Of Meat Products Mar. 7, 2010.
Communication pursuant to Article 94(3) EPC for EP Application No. 14850534 (dated May 31, 2018).
International Search Report and Written Opinion for PCT/US2018/053792, dated Dec. 21, 2018.
Communication pursuant to Article 94(3) EPC for EP Application No. 18799897.6 (dated Mar. 2, 2021).

*Primary Examiner* — Vera Stulii
(74) *Attorney, Agent, or Firm* — Nyemaster Goode P.C.

(57) ABSTRACT

A process for producing a protein product for addition to raw meat wherein the source of the protein product is animal muscle or mechanically deboned meat. The animal muscle tissue is mixed with water and homogenized. Protein in the homogenate is solubilized. Solubilized homogenate is heated to a temperature required for pasteurization and/or sterilization according to known standards. The homogenate is then adjusted to a value at which the protein precipitates. The precipitate is free of bacteria and toxins and can be used as meat or added to raw meat for delivery to a consumer as uncooked meat.

36 Claims, 1 Drawing Sheet

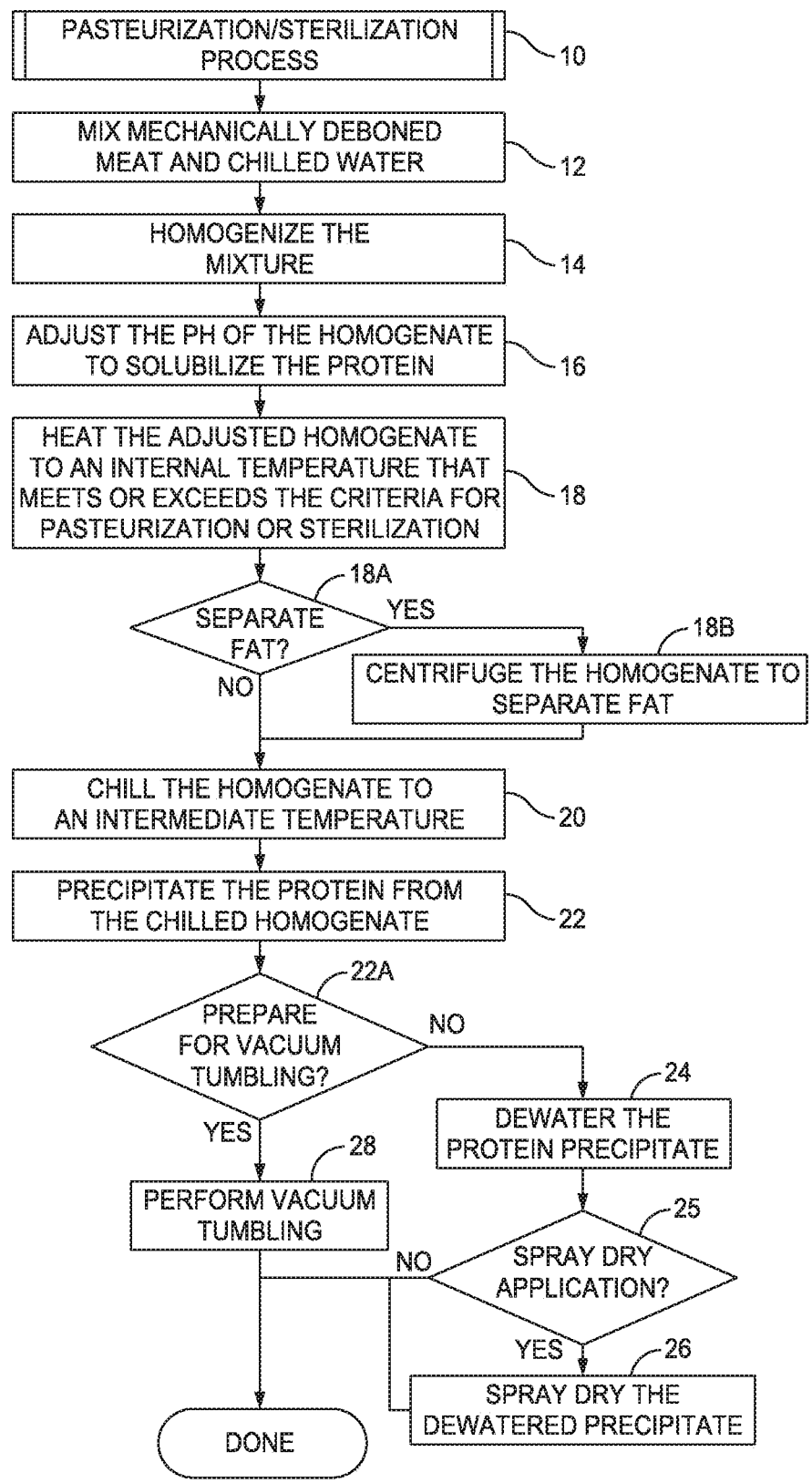

US 11,484,043 B2

FUNCTIONAL PROTEIN DERIVED FROM ANIMAL MUSCLE TISSUE OR MECHANICALLY DEBONED MEAT AND METHOD FOR MAKING THE SAME

RELATED APPLICATION

This application is a continuation application of U.S. application Ser. No. 14/506,615, filed Oct. 4, 2014, entitled, "Functional Protein Derived From Animal Muscle Tissue Or Mechanically Deboned Meat And Method For Making The Same" by Kelleher et al., which claims the benefit of U.S. Provisional Application No. 61/886,889, filed Oct. 4, 2013, entitled, "Protein Derived From Animal Muscle Tissue Or Mechanically Deboned Meat And Method For Making The Same Using Food Preservation Methods" by Kelleher et al. The entire teachings of the above applications are incorporated herein by reference.

BACKGROUND OF THE INVENTION

Field of the Invention

This invention generally relates to protein compositions derived from animal muscle tissue for incorporation into raw food and more specifically provides a protein composition with a reduced risk of being contaminated by various microorganisms.

Description of Related Art

Over a number of years research has been directed to the isolation of proteins from animal muscle tissue and the application of such isolated proteins to various foods to achieve improved functionality in comparison with foods cooked without such proteins. For example, when certain of these prior art proteins have been sprayed onto food to be cooked by frying, the cooked food has a reduced fat content over food that does not include such protein. In other applications, food cooked with the addition of such prior art protein, as by injection, retains more moisture than untreated cooked food.

Food safety is an important concern in today's modern food processing plants and methods are always being sought after to reduce overall bacteria or pathogen counts. For some foods, pasteurization is selected as a food preservation method; in others, sterilization. In many countries, such as Australia, the importation of meat products into a country requires that the meat products be either pasteurized or sterilized before such products can be imported to that country. A procedure that could assure pasteurization or sterilization of meat products without reducing the meat's functionality would be most desirable. Also, a procedure that could utilize a starting material that is potentially inherently high in pathogens, such as mechanically deboned meat, could provide significant economic advantages. Prior art protein isolation methods include the steps of mixing the animal muscle tissue in water, solubilizing the mixture and then precipitating the protein from the mixture.

When harvesting has been completed, some animal muscle tissue remains attached to bones. Such attached animal muscle tissue is a potentially commercially viable animal muscle tissue for obtaining protein. "Deboning" is an efficient process for recovering such residual animal muscle tissue from the bones. During deboning animal muscle tissue is separated from a bone by scraping, shaving or pressing the attached animal muscle tissue from the bone. Deboned product is called "mechanically deboned meat" or "mechanically separated meat." While such a process theoretically could provide an economical source of animal muscle tissue for the isolation of protein, commercial deboning commonly tests high in bacteria and/or positive in food-borne pathogens, including salmonella. Due to the inherent risk of these bacteria many food processors require any product including mechanically deboned meat or even protein obtained from mechanically deboned meat be fully cooked for human consumption for health reasons and not sold in a raw state. Specifically, a food processing company must heat a "ready-to-eat" product to an internal temperature of at least 160° F. to achieve a lethality in the range of 6.5-$\log_{10}$ to 7.0-$\log_{10}$. This requirement limits the applications for mechanically deboned meat primarily by imposing significant manufacturing costs and by producing a meat product that is "well done" and that loses moisture during cooking.

What is needed is a food preparation method for obtaining protein from animal meat or mechanically deboned meat whereby the protein product can be consumed alone or added to raw meat such that the final product meets or exceeds the government and commercial standards for bacteria and toxic content without cooking the raw meat and that retains moisture prior to a consumer's cooking the final product.

SUMMARY

Therefore, it is an object of this invention to provide a process by which a protein product can be obtained from animal muscle or mechanically deboned meat that can be consumed alone or added to meat so that a final product meets or exceeds government and commercial regulations and a corresponding protein product.

Another object of this invention is to provide a process by which a protein product obtained from animal muscle tissue or mechanically deboned meat can be added to raw meat to obtain a final product without cooking the final product and corresponding protein product.

Still another object of this invention is to provide a protein product obtained from animal muscle tissue or mechanically deboned meat that can be added to raw meat without cooking while retaining the functionality of the raw meat.

In accordance with one aspect this invention a process for producing a pasteurized or sterilized protein product from animal muscle tissue obtained from raw meat or mechanically deboned meat for application to raw meat includes homogenizing the animal muscle tissue from the raw meat or mechanically deboned animal muscle tissue and water. After adjusting the pH of the homogenate to solubilize the protein, the process elevates temperature of the homogenate to an internal temperature required for pasteurization or sterilization for at least a required time. The homogenate is then chilled to an intermediate temperature whereupon the protein is precipitated from the homogenate. The precipitate moisture content is then adjusted to a desired value. As the precipitated protein has been pasteurized or sterilized, there is no need for cooking a meat product containing the precipitated protein and such a protein product would meet or exceed bacterial standards established by an importing country.

In accordance with another aspect of this invention, a process for producing a pasteurized or sterilized protein product from animal muscle tissue obtained from animal meat for application to raw meat is obtained by mixing and homogenizing the animal muscle tissue and water. After adjusting the pH of the homogenate to solubilize the protein, the process elevates the temperature of the pH adjusted homogenate to an internal temperature required for pasteurization or sterilization. The homogenate is then chilled to an intermediate temperature whereupon the protein is precipitated from the chilled homogenate by adjusting the pH of the chilled homogenate into the isoelectric range. Then the process dewaters the precipitate to a desired moisture content.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawing which is a flow chart that describes a process for implementing this invention.

The FIGURE describes the steps of the pasteurizing or sterilizing process for a protein product derived from raw meat or mechanically deboned meat.

DESCRIPTION OF ILLUSTRATIVE EMBODIMENTS

A pasteurizing or sterilizing process 10 for a protein product derived from raw meat or mechanically deboned meat is shown in the FIGURE. Process 10 enables animal muscle tissue or mechanically deboned meat to serve as a protein source for application to raw meat so that the final product meets or exceeds standards for various bacteria and toxic contents without the need for cooking. That is, such protein can be used "as is" (e.g., as hamburger, hotdog stuffing, or sausage stuffing), added to uncooked meat (such as poultry), as a marinade, or spray dried as a protein powder, thereby enabling the sale of the pasteurized/sterilized protein for human consumption. The pasteurization step eliminates bacterial pathogens of concern for meat products such as salmonella in poultry, and sterilization produces a final product with the added security of eliminating bacterial spores as well as vegetative pathogenic bacteria. Consequently if a food processor in a country can supply raw meat according to the government and commercial regulations of that country, the food processor can import the pasteurized or sterilized protein product without a concern that the combination of the raw meat and the protein product will affect the quality of the mixed meat and protein product.

As shown in the FIGURE, food pasteurization/sterilization process 10 uses step 12 to mix the animal muscle (meat) or mechanically deboned meat and chilled water. The types of meat that can be used in the steps of the present invention include beef, poultry, fish or other muscle tissue from an animal. Step 12 involves mixing mechanically deboned meat with water in a ratio of parts of meat to water ranging from about 1:9 to about 1:4. The water can be added immediately after deboning, or sometime after deboning the meat. The temperature of the chilled water ranges from just above the freezing point to a point below room temperature. For example, the temperature of the chilled water ranges from about 34° F. to about 45° F., and in an embodiment is between 37° F. and about 40° F. Step 12 results in a chilled mixture of water and deboned meat. Alternatively, Step 12 can use cool tap water, or can be optional.

In step 14, this chilled mixture is then homogenized. Homogenization refers to a process in which the particles in a mixture become uniform or evenly distributed. In the case of the present invention, step 14 homogenizes the deboned meat and chilled water so that the meat is uniformly present throughout the liquid solution (i.e., a "homogenate"). Homogenization can occur using any commercially available apparatus such as a food chopper or cutting/dispersion machine. Examples of such machines that can be used homogenize the chilled mixture include STEPHAN MICROCUT cutting and dispersing systems (Hamelin, Germany), KARL SCHNELL mixers (New London, Wis.) or WARING Model WSB immersion blenders. The length of time needed to achieve a uniform homogenate depends on the amount of the chilled mixture, the type of motor on the apparatus, and capacity of the machine being used. In an embodiment, homogenization can be performed in a time ranging between about 30 seconds and about 15 minutes (e.g., between 40 seconds and about 2 minutes). In an aspect, the addition of chilled water to the deboned meat, and homogenizing can happen simultaneously or there can be overlap between the steps (e.g., a portion of the chilled water can be added gradually after chopper has been turned on). During the homogenization step, it is believed that the available surface area of the protein is increased so that it can better, more effectively solubilize in the next step, step 16.

In step 16, the protein homogenate from step 14 is solubilized. Solubility can occur with the addition of a biocompatible acid. As used herein, "solubilized protein" refers to the protein being dissolved in liquid. In an embodiment, acid is added in a sufficient amount and concentration to allow the protein to dissolve or solubilize without denaturing the protein. Examples of biocompatible acids that can be used for the present invention include citric acid, phosphoric acid, ascorbic acid or hydrochloric acid. Other acids, previously known or later developed, can be used in the steps of the present invention so long as they solubilize the protein under conditions described herein and are biocompatible. The concentration of the biocompatible acid will depend on the particular acid being used and the composition (e.g., liquid or powder acid forms) but ranges between about 0.5M to about 3M (e.g., between about 1M and about 2 M) (molarity) or between 0.2% to about 90% w/w % (approximate strength). For example, in the case of citric acid, a concentration of about 2M (e.g., between about 0.5M and about 3M) and in the case of hydrochloric acid, a concentration of 1M (e.g., between 0.2 and about 2M) can be used to solubilize the protein. With respect to phosphoric acid, an 85% strength can be used. In the case of citric acid and phosphoric, about 0.3% and about 1% by weight can be used, and for hydrochloric acid, a range of about 0.2 to about 0.5% by weight can be used with the steps of the present invention. When using ascorbic acid with the methods of the present invention, its powder/crystalline form can be used in which case the ascorbic acid power can be added directly to the homogenate. The choice of the biocompatible acid and its concentration should be one that does not denature the protein in the homogenate. In step 16, the biocompatible acid adjusts the pH of the homogenate to obtain a resulting pH in the range of equal to or between about 3.6 and about 4.2 (e.g., 3.6, 3.7, 3.8, 3.9, 4.0, 4.1 and 4.2). Upon obtaining a pH in this range, one can proceed to the next step, Step 18.

Step 18 heats the adjusted pH homogenate with the solubilized protein to an internal temperature for a specified time that meets or exceeds government and commercial regulations that define the temperature and time required for pasteurization or sterilization. For example, the charts below are the current governmental guidelines to pasteurize beef, poultry or fish. Obtaining meat that is safe for human consumption using the pasteurization process is a function of the type of meat, the temperature and the desired lethality/reduction in salmonella. Generally, salmonella is one of the more difficult bacteria to reduce to safe levels and is used as benchmark for determining the safety of human consumption of meat. Often, if the pasteurization/sterilization step is able to reduce salmonella by at least about 6.5 (e.g., or about 7) on a log 10 scale, then other harmful bacteria are also considered to be reduced (excluding harmful spores which are reduced by sterilization).

TABLE 1

FSIS, Appendix A for Beef

| Minimum Internal Temperature | | Minimum processing time in minutes or seconds after minimum temperature is reached | |
|---|---|---|---|
| Degrees Fahrenheit | Degrees Centigrade | 6.5-Log10 Lethality | 7-Log10 Lethality |
| 130 | 54.4 | 112 min. | 121 min. |
| 131 | 55.0 | 89 min. | 97 min. |
| 132 | 55.6 | 71 min. | 77 min. |
| 133 | 56.1 | 56 min. | 62 min. |
| 134 | 56.7 | 45 min. | 47 min. |
| 135 | 57.2 | 36 min. | 37 min. |
| 136 | 57.8 | 28 min | 32 min. |
| 137 | 58.4 | 23 min. | 24 min. |
| 138 | 58.9 | 18 min | 19 min. |
| 139 | 59.5 | 15 min. | 15 min. |
| 140 | 60.0 | 12 min. | 12 min. |
| 141 | 60.6 | 9 min | 10 min. |
| 142 | 61.1 | 8 min. | 8 min. |
| 143 | 61.7 | 6 min | 6 min |
| 144 | 62.2 | 5 min. | 5 min. |
| 145 | 62.8 | 4 min.* | 4 min.* |
| 146 | 63.3 | 169 sec. | 182 sec. |
| 147 | 63.9 | 134 sec | 144 sec. |
| 148 | 64.4 | 107 sec | 115 sec. |
| 149 | 65.0 | 85 sec | 91 sec. |
| 150 | 65.6 | 67 sec. | 72 sec. |
| 151 | 66.1 | 54 sec | 58 sec. |
| 152 | 66.7 | 43 sec | 46 sec. |
| 153 | 67.2 | 34 sec | 37 sec |
| 154 | 67.8 | 27 sec. | 29 sec |
| 155 | 68.3 | 22 sec. | 23 sec. |
| 156 | 68.9 | 17 sec. | 19 sec. |
| 157 | 69.4 | 14 sec. | 15 sec. |
| 158 | 70.0 | 0 sec.** | 0 sec.** |
| 159 | 70.6 | 0 sec.** | 0 sec.** |
| 160 | 71.1 | 0 sec.** | 0 sec.** |

*Past regulations have listed the minimum processing time for roast beef cooked to 145° F. as "Instantly." However, due to their large size, most of these roasts dwell at 145° F., or even at higher temperatures, for at least 4 minutes after the minimum internal temperature is reached. FSIS has revised this time/temperature table to reflect this and emphasizes that, to better ensure compliance with the performance standard, establishments should ensure a dwell time of at least 4 minutes if 145° F. is the minimum internal temperature employed.
**The required lethalities are achieved instantly when the internal temperature of a cooked meat product reaches 158° F. or above.

As can be seen in Table 1, the pasteurization temperature ranges from about 130° F. to about 160° F., and the time ranges from about 0 seconds to about 121 minutes such that 6.5 log10 (e.g., or about 7 log10) salmonella bacteria is reduced to acceptable levels. In an embodiment, pasteurization can be achieved merely by heating a food product until the internal temperature is elevated to at least 160° F. (72° C.). Once this internal temperature of 160° F. is reached, then the bacteria die without regard to time (i.e., 0 seconds). In an aspect, Table 1 indicates that these temperature and times are used for beef, however, in the food industry, these temperatures and times are used for other meat types described herein. Generally, if salmonella is at safe levels when cooking beef, then it is at safe levels cooking other types of meat because this beef table is the higher of these standards. According to one sterilization standard, a food product must be heated to at least 250° F. (121° C.) and held at that temperature for 10 minutes. Step 18 results in a composition referred to herein as a "heated homogenate" or a "pasteurized/sterilized homogenate."

The heated homogenate can then be optionally processed to separate the protein from the lipids/fat in decision box 18A. If desired, lipid separation can be performed by using centrifugation (Step 18B). If performed, centrifugation occurs, in an aspect, in a range between about 3200 RPMs and about 5000 RPMs for between about 1 minute and about 10 minutes (e.g., between about 2 and about 5 minutes) or during a continuous operation in which the heated homogenate is continuously flowing throughout the system including the centrifugation. During centrifugation, heated homogenate is separated to form a protein rich aqueous phase and a lipid phase. The lipid phase is removed to leave a protein rich solution. Centrifuges that can be used for Step 18B include disc centrifuges from Alfa Laval (Lund, Sweden).

After step 18 raises the temperature to the pasteurization or sterilization temperature for the specified time, if any, step 20 chills the pasteurized/sterilized homogenate to an intermediate temperature. The temperature of the pasteurized/sterilized homogenate is lowered to a range between the freezing point and room temperature. In an embodiment, the temperature at step 20 is lowered to a range equal to or between about 34° F. and about 45° F. (equal to or between about 1° C. and about 4° C.). In an aspect, the time to lower the pasteurized/sterilized homogenate will vary depending on apparatus used, the volume and density of the pasteurized/sterilized homogenate. Once the temperature of the pasteurized/sterilized homogenate is uniformly lowered to the desired range, a chilled, pasteurized/sterilized homogenate is obtained and ready for the next step.

Devices for heating and/or chilling are known in the art and commercially available. Step 18, the pasteurization/sterilization step, can be carried out by any device that can deliver the amount of heat needed to achieve conditions for pasteurization and/or sterilization described herein. Examples of such devices include heat exchangers, including falling film heat exchangers and tubular heat exchangers. Heat exchangers are able to deliver heat as well as cool the meat and if used in present invention, can be used in both steps 18 and 20. In an embodiment in which a heat exchanger is not used, a heater/oven or other device can be used to irradiate heat to accomplish step 18, and a refrigerator or other similar device can be used to cool the homogenate. An example of a heater is Commercial Cooking Appliance Model KR-S2 hot plate.

Once the chilled, pasteurized/sterilized homogenate is obtained, the protein can be precipitated from the solution. In an embodiment, precipitation occurs at step 22 by adjusting the pH of the chilled homogenate into the isoelectric range of the meat involved. The isoelectric range for meat, in general, is a pH between about 4.2 and about 6.4 (e.g., a pH of about 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, and 6.4). The isoelectric range can depend, for instant, on conditions such as salt, the type of protein, the charge of the protein, the amino acids that make up the protein, and the ionic strength of the solution in which the protein is subjected to. Adjusting the pH to the aforementioned isoelectric range can be performed by adding a basic solution to the chilled, pasteurized/sterilized homogenate. Any biocompatible base can be used to adjust the pH to these ranges. Examples of such bases include sodium carbonate or sodium bicarbonate. In an embodiment, sodium carbonate can be used in a concentration between about 0.7% and about 10% solution, and sodium bicarbonate can be used in a concentration between about 0.5% to about 10% solution (e.g., between about 5 and 6%). The volume and concentration of base used to buffer the chilled, pasteurized/sterilized homogenate to the desired pH will depend on the starting pH of the solution, and the volume of the solution being brought to the proper pH.

Another way to precipitate the protein from the chilled, pasteurized/sterilized homogenate is to add salt. Examples of salts that can be used to precipitate the protein from solution include sodium chloride (NaCl) and potassium chloride KCl). The concentration of NaCl or KCl ranges between about 3.5% and about 8% by weight. Step 22 results in a mixture having a protein precipitate that has been pasteurized/sterilized (hereinafter referred to as "protein precipitate mixture").

The next steps performed depend on the end product desired. The end meat product can be a ground (e.g., hamburger/sausage/hotdog) type end product, a protein marinade, or a protein powder. For example, if vacuum tumbling is not required for a particular end product, such as a marinade, decision box 22A transfers control to step 24 to dewater the protein precipitate. In this step water is removed from the protein precipitate mixture by using a strainer, decanting centrifuge or filtration. The amount of water removed can vary, again based on the desired end product. Step 24 then de-waters the precipitate to the desired moisture content. In one embodiment, the moisture content of the protein precipitate mixture after dewatering can range from between about 90% and 99%. The resulting protein is one that is of a hamburger/sausage stuffing texture (also referred to as "dewatered precipitate").

If a protein powder is desired, one can decide to spray dry the dewatered precipitate, causing decision box 25 to transfer control to Step 26. Spray drying can be performed by commercially available apparatus, such as a 30-inch Bowen Spray Drying unit, machine or a GEA Niro Food Spray Dryer (Søborg, Denmark). Pre-treatment steps may be taken to prevent denaturing of the protein during the spray drying process, and include, for example, adding sodium bicarbonate to the dewatered precipitate to a pH equal to or between about 6.5 to about 8.0. If spray drying is not required decision box 25 terminates the process In the case in which a marinade is desired, the steps of the present invention include performing vacuum tumbling, Vacuum tumbling pulls water into the mixture uniformly. If vacuum tumbling is desired, decision box 22A transfers control to step 28. Vacuum tumbling may last for between about 20 minutes to about 90 minutes. Step 28, to add water to the protein precipitate mixture. A vacuum tumbler, such as a BIRO Manufacturing Model VTS-500 Vacuum Tumbler. The vacuum tumbling process pulls water into the mixture in a uniform way. In an embodiment, step 28 tumbles the protein precipitate mixture The vacuum tumbling step is optional, especially if the desired end product is not a marinade. The resulting protein is a protein marinade.

The resulting pasteurized protein does not contain undesirable levels of pathogenic bacteria or toxic contents; the resulting sterilized protein does not contain any levels of pathogenic bacteria or toxic contents. Thus, the precipitate can be used "as is" or then can be applied to raw meat for sale to consumers without cooking. The methods of the present invention result in a functional meat composition. A functional meat composition is one that acts like raw, uncooked meat. Surprisingly, the present invention provides the benefits of cooked food because the meat composition is pasteurized/sterilized meat but looks and acts like raw meat. Functional meat is defined as a meat composition that acts like raw meat with respect to one or more of the following characteristics: water binding, meat emulsion and/or moisture retention. The present invention includes meat compositions that meet or exceed one or more of these functional meat characteristics.

Water binding ability refers to the ability of the meat to retain and/or uptake moisture and can be tested using the procedure of Hand et. al. "A Technique to Measure the Water Uptake Properties of Meat," $77^{th}$ Annual Meeting of the American Society of Animal Science, Paper No. 202 (1985). Briefly, water binding ability can be determined by adding added water to meat, shaking it, and centrifuging it. After centrifugation, the centrifuged meat is placed on a mesh wire screen and then weighed. Meat products that undergo the steps of the present invention have a water binding ability that is the same or greater, as compared to meat that does not undergo the steps of the present invention. In an embodiment, meat products that undergo the steps of the invention have a water binding ability that is about 1% to about 125% greater (e.g., between about 40% and about 60% greater), as compared to meat that does not undergo the steps of the invention. See Example 1 in which 60% and 110% water binding occurred with meat that underwent the steps of the invention, as compared to the control.

Meat emulsion, sometimes referred to as fat emulsion, refers generally to the ability for the meat to bind or adhere to itself (e.g., its ability to stick together) and/or to form a protein matrix (e.g., a viscous meat batter). In an instance, the phrase "meat emulsion" refers to the binding ability of protein, fat, water and optionally other types of ingredients normally added to such a mix (e.g., butter, mayonnaise, seasonings, and the like). One can determine if a meat emulsion is formed by observation. It can also be measured in terms of its capacity (e.g., the maximum amount of fat or oil stabilized by a given amount of protein) or stability (the amount of fat or oil retained or separated after stressing with heat the formed emulsion/batter).

Moisture retention refers to amount/content of moisture retained in the meat product at any given time. Moisture retention in a meat product can be determined by using moisture analyzers (e.g., Ohaus MB Model 25) or by observation (e.g., observing the amount of moisture that drips or escapes the meat). Meat products that undergo the steps of the present invention have moisture retention that is also the same or greater, as compared to meat that does not undergo the steps of the present invention. In an aspect, meat products that undergo the steps of the invention have moisture that is about the same or about 1% to about 5% greater (e.g., between about 2% and about 3% greater), as compared to meat that does not undergo the steps of the invention. Moisture retention can be controlled in the dewatering step so that, if desired, moisture retention can be brought down to its original moisture content.

Unexpectedly it was found that the moisture binding ability of the product using the heated (pasteurized) protein was greater than the moisture binding ability obtained with heated (unpasteurized) protein. Also unexpectedly the appearance of the pasteurized product of this invention had the physical appearance of raw uncooked poultry without the addition of the protein product.

The end product can be added to food since it is pasteurized/sterilized. In one aspect of this invention, the composition of the present invention can be added to food such as ground meat, fish, poultry and the like. For example, a marinade made by the present invention can be used to marinate meat, such as chicken (see Example 2). After marinating chicken with and without the marinades made from the present invention, the uncooked chicken breast with the marinade of the present invention possessed about the same amount of moisture as the control marinade. The control marinade had a phosphate/salt preservative. After cooking, cook yield of the control and the chicken having the marinade of the present invention each had a cook yield of above about 80% (about 85%, 90%, 95%, or 100%). Generally, a marinade without a preservative will have a cook yield under 80%. Accordingly, the present invention allows for cook yields that mimic those obtained with preservatives (e.g., phosphate/salt), without having to use the preservative. In an embodiment, marinades made from the present invention and incorporated into other meats have cook yields that are about the same, as compared to that with preservatives.

The animal muscle tissue which undergoes the steps of the present invention include, for example, meat and fish, including shell fish. Representative suitable fish include deboned flounder, sole, haddock, cod, sea bass, salmon, tuna, trout or the like. Representative suitable shell fish include shelled shrimp, crabmeat, crayfish, lobster, scallops, oysters, or shrimp in the shell or the like. Representative suitable meats include ham, beef, lamb, pork, venison, veal, buffalo or the like; poultry such as chicken, mechanically deboned poultry meat, turkey, duck, a game bird or goose or the like either in fillet form or in ground form such as hamburger. In addition, meat products that can be made using the steps of the present invention include animal muscle tissue such as a sausage composition, a hot dog composition or an emulsified product. Sausage and hot dog compositions include ground meat or poultry, herbs such as sage, spices, sugar, pepper, salt and fillers such as dairy products as is well known in the art.

Example 1

The following example provides a measure of moisture retention in raw meat treated with pasteurized protein product in accordance with this invention. This example uses cold processed chicken to determine whether increasing the homogenate temperature to a pasteurizing temperature would reduce moisture retention of raw chicken treated with pasteurized protein product. It is assumed that obtaining protein from whole chicken or mechanically deboned chicken would have no significant impact on the moisture retention properties of the final chicken product. That is, tests of protein made from cold processed chicken, rather than deboned chicken, should be a good predictor of moisture retention for protein obtained from deboned chicken. In this example, step 12 performed mixing by using 1 part of chopped fresh chicken to 5 parts of chilled water by weight. The temperature of the mixture could be in the range of 34° F.≤T≤40° F. (i.e., 1° C.≤T≤4° C.). The specific temperature in the range of 34° F.≤T≤40° F. (i.e., 3° C.≤T≤4° C.) was used for this example.

Homogenizing the mixture in accordance with step 14 was performed with a Sunbeam hand chopper. The hand chopper was operated for about 45 seconds. This created an approximate particle size of 150 µm.

In step 16 the homogenate pH was lowered to about 2.8 by adding a liquid 25% citric acid solution. This produced a chicken protein solution. An Oakton pH 6 Acorn series meter calibrated at pH4 and pH7 with standard buffer solutions measured the pH.

In step 18, 235 grams of the chicken protein solution were placed into 250 ml Erlenmeyer flasks. The flasks were placed in a 170° F. (i.e., 77° C.) water bath. A Taylor thermometer standardized by ice water measured the temperature which reached 160° F. (i.e., 71° C.) in approximately 15 minutes. Step 20 immediately chilled the emulsion to 38° F. (i.e., 3° C.) by placing the Erlenmeyer flasks into an ice bath in a refrigerator to aid in chilling, During step 22 the pH of the chilled homogenate was treated to precipitate the protein. In one sample 4% w/w sodium chloride was added to a sample and the sample was stirred to achieve a pH of 2.25. In another sample, precipitation was induced by adjusting the pH to 4.8 using powdered sodium bicarbonate.

Step 24 de-watered the protein flocculent obtained in step 22 by means of an approximately 1,000 mesh strainer until the precipitate returned to its approximate original moisture content of between 68.75% and 84.75% with a mean of 78.21%.

Moisture tests were performed on the chicken samples using an Ohaus MB Model 25 moisture analyzer set on "Automatic Determination" with a drying temperature of 130° C. for an approximately 5 gram sample size, To test the water binding ability, the above-identified procedure of Hand et. al. was used. 25 grams of protein were placed into pre-weighed, 250 ml Nalgene Centrifuge bottles. Then 50 grams of 2° C. distilled water were added to each of the centrifuge bottles. The bottles were consistently and vigorously shaken by hand for 30 seconds and then centrifuged at 2° C. using a DuPont Sorvall RC-5B refrigerated centrifuge at 3,000 rpm for 10 minutes. The centrifuge bottles were then removed and immediately inverted over an approximate 1000 mesh wire screen for 1 minute. Transfer of any solids that may have fallen from the tube onto the screen were put back into the tube and the tube was then re-weighed.

Table 2 identifies the percentage of water held per solid gram:

TABLE 2

| Treatment | Protein Product | % Moisture/Gram of Protein |
| --- | --- | --- |
| Raw Chicken Breast/Control/ no steps of the invention performed | Unheated Proteins | 140.2[a] |
| Citric Acid (Step 16)/ Sodium Bicarbonate (Step 22) | Heated Proteins (Step 18) | 224.2[b] |
| | Unheated Proteins (no Step 18) | 141.1[a] |
| Citric Acid (Step16)/ 4% Salt (Step 22) | Heated Proteins | 297.8[c] |

Specifically, this information represents data obtained from n=24-30 samples with p≤0.05 indicating a degree of confidence greater than 95%. Table 2 demonstrates that the data for the water binding ability for unheated proteins solubilized with citric acid and precipitated with sodium bicarbonate was statistically equal to the raw chicken breasts with unheated proteins. The data for the water binding ability for heated proteins using sodium bicarbonate for precipitation was significantly different from the data for unheated proteins. The data for the water binding ability for heated proteins precipitated with salt was significantly different from the data of both the unheated proteins and from the data for the heated proteins precipitated with sodium bicarbonate.

It is concluded that heating the homogenate at low pH was not detrimental to the moisture retention of the final product. When the chicken breast was processed using citric acid to solubilize the protein and sodium bicarbonate to precipitate the protein after heating the homogenate to a pasteurizing temperature, the moisture per gram of protein significantly increased. This demonstrates that processing proteins in accordance with this invention by heating provides an unexpected result of actually improving the moisture retention functionality of the product. A greater increase in moisture was obtained by precipitating the heated proteins with a 4% salt solution.

Example 2

Protein Production

The following example provides a measure of moisture retention in cooked chicken treated with pasteurized, spray dried, protein product in accordance with this invention that has been hydrated prior to use.

In this example, step 12 was performed mixing by using 1 part chopped fresh turkey breast to 5 parts chilled water by weight. The temperature of the chilled water was 37° F. Homogenizing the mixture in accordance with step 14 was performed with a Waring Model WSB immersion blender on high speed for two minutes. The pH of the homogenate was lowered to pH 3.7 in step 16 using granular citric acid. An Oakton pH 6 Acorn series meter calibrated at pH 4.01 and pH 7.00 with standard buffer solutions measured the pH.

In step 18 approximately four gallons per batch of acidified, turkey protein solutions were heated on a Commercial Cooking Appliance Model KR-S2 hot plate with constant stirring, until a temperature of 161° F. was achieved. A Control Company Traceable, infra-red thermometer was used to determine the temperature of the solution. The thermometer was standardized against ice.

In step 20 the heated solution was chilled to a temperature <40° F. in a refrigerator. In step 22 the pH was adjusted using sodium bicarbonate (6% solution) to precipitate the protein. In step 24 the precipitate was filtered through a China cap with 1 mm holes to assist in de-watering.

In a pretreatment step, the partially de-watered protein precipitate was further adjusted using powdered sodium bicarbonate until a pH of 6.8 was achieved. The cooled neutralized protein solutions were packed into 5 gallon bladder bags and transported under refrigeration for drying.

Spray Drying

In step 26 Spray drying was performed at Summit Custom Spray Drying, Flemington, N.J. on the protein solutions on a 30-inch Bowen Spray Drying unit. The inlet temperatures were 365-370° F., and the outlet temperatures were 225° F. Spray drying took place over a two day period with Day 1 resulting in 0.52 lbs. packed powder and 0.43 lbs. chamber material, and Day 2 resulting in 0.0775 lbs. packed powder and 0.28 lbs. chamber material. The packed protein powder was placed into polyethylene bags and analyzed for full nutritional and amino acid analysis.

Functionality

To test the moisture retention ability of the spray dried pasteurized proteins a marinade was made using the proteins (re-hydrated), salt and water as components. A comparison was performed using a standard phosphate marinade as a control. The control marinade was manufactured using 6% salt, 2.8% Brifisol 512 (phosphate), and 91.2% cold water (<40° F.). The ingredients were placed into a stainless steel mixing bowl and homogenized using a Sunbeam kitchen hand mixer for 8 min. The pasteurized protein marinade was made using 4% spray dried pasteurized protein, 6% salt and 90% cold water (<40° F.) and homogenized as described above. The final pH's of the marinades were pH 6.84 for the phosphate/salt sample and pH 6.50 for the protein/salt sample. The marinades were separately placed into a Marinade Express vacuum tumbler and rotated on slow (only) speed for 20 minutes with fresh chicken breasts. The ratio of chicken to marinade was the same for both the control and protein marinades (82% chicken to 18% marinade). The marinated chicken breasts were weighed after vacuum tumbling and the control pick up was 12.77% and the protein sample pick up was 13.21%.

After the vacuum tumbling step, cooked moisture retention was evaluated by placing marinated chicken breasts onto sheet pans and placing the pre-weighed, marinated chicken breasts into a Cadco UNOX convection oven set at 350° F., with convection on, for 30 minutes. After the 30 minute cook the breasts were allowed to set at room temperature for 5 minutes and weighed. The results of the experiment are shown in Table 3.

TABLE 3

Cook Yields for Marinated Chicken Breasts

| Marinade | Breast Wgt. Before Cook (g) | Breast Wgt. After Cook (g) | Cook Yield (%) |
|---|---|---|---|
| Control | 309.03 | 276.39 | 89.44 |
| (Phosphate/Salt) | 264.86 | 215.79 | 81.47 |
|  | 305.62 | 252.15 | 82.50 |
| Average |  |  | 84.47 |
| Test (Protein/Salt) | 273.78 | 242.40 | 88.54 |
|  | 288.44 | 245.03 | 84.95 |
|  | 285.58 | 246.03 | 86.15 |
| Average |  |  | 86.55 |

Discussion

Acidified turkey protein that was heated to pasteurizing temperatures (USDA Handbook Appendix A) and spray dried was shown to have improved water retaining ability on cooked product when used as a marinade and compared to an industry standard, phosphate and salt. Typical results in the industry for marinades containing salt and water alone (no phosphate) have cook yields under 80%.

This invention therefore provides a product that meets the various objectives of this invention. Specifically, this invention provides a process by which a protein product obtained from animal muscle or mechanically deboned meat can be used "as is" or added to raw meat without any cooking requirement to meet or exceed bacterial/pathogen regulations or specifications. Moreover, the addition of a protein product obtained from mechanically deboned meat in accordance with this invention enhances functionality of the cooked food by increasing the moisture retention in the cooked food.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A process for producing a protein product wherein the protein product has a reduced pathogen level and retains a functionality of raw meat, wherein the protein product is obtained from animal muscle tissue, the process comprises the steps of:

A) homogenizing the animal muscle tissue and water, to thereby obtain a homogenate;

B) adjusting the pH of the homogenate of step A) to a range between 3.6 to 4.2 to obtain a solubilized liquid protein solution; and C) elevating the temperature of the solubilized liquid protein solution of step B) to 158° F. or above for at least an instant, or to an internal temperature of about 130° F. and about 157° F. for at least between about 14 seconds to about 121 minutes to obtain a solubilized liquid protein solution with a reduced pathogen level, wherein the reduced pathogen level comprises at least a reduction in salmonella by 6.5 $\log_{10}$; and wherein the solubilized liquid protein solution of Step C has the reduced pathogen level as compared to a solubilized liquid protein solution that has not undergone step C) and wherein the solubilized liquid protein of Step C retains the functionality of raw meat.

2. The process of claim 1, further comprising precipitating the solubilized liquid protein solution with a reduced pathogen level of Step C to obtain a precipitated protein.

3. The process of claim 2 wherein said pH adjustment for precipitating includes the addition of a base to increase the pH to a value in the range of 4.2≤pH≤6.4. 4 or the addition of salt or both.

4. The process of claim 1 wherein said temperature elevation raises the temperature of the solubilized protein to at least 160° F. for pasteurization or to at least 250° F. for 10 minutes for sterilization.

5. The process of claim 2 further comprising dewatering the precipitated protein to a desired moisture content.

6. A protein product having a reduced pathogen level and retaining a functionality of raw meat, wherein the protein product is from animal muscle tissue and is obtained from a process comprising the steps of:

A) homogenizing the animal muscle tissue and water, to thereby obtain a homogenate;

B) adjusting the pH in a range of the homogenate of step A) to a range between 3.6 to 4.2 to obtain a solubilized liquid protein solution; and C) elevating the temperature of the solubilized liquid protein solution of step B) to 158° F. or above for at least an instant, or to an internal temperature of about 130° F. and about 157° F. for at least between about 14 seconds to about 121 minutes obtain a solubilized liquid protein solution with a reduced pathogen level, wherein the reduced pathogen level comprises at least a reduction in salmonella by 6.5 $\log_{10}$;

wherein the solubilized liquid protein solution of Step C has the reduced pathogen level as compared to a solubilized liquid protein solution that has not undergone step C) and wherein the solubilized liquid protein of Step C retains the functionality of raw meat.

7. The protein product of claim 6, further comprising precipitating the solubilized liquid protein solution with a reduced pathogen level of Step C to obtain a precipitated protein.

8. The protein product of claim 7, wherein said pH adjustment for precipitating includes the addition of a base to increase the pH to a value in the range of 4.2≤pH≤6.4. 4 or the addition of a salt or both.

9. The protein product of claim 6, wherein said temperature elevation raises the temperature of the solubilized protein to at least 160° F. for pasteurization or to at least 250° F. for 10 minutes for sterilization.

10. The protein product of claim 7, further comprising dewatering the precipitated protein to a desired moisture content, wherein the pH of the dewatered protein precipitate is adjusted to a range between about 6.5 to about 8.0.

11. The protein product of claim 10, wherein spray drying the dewatered protein precipitate.

12. The protein product of claim 6, wherein spray drying the solubilized liquid protein solution with a reduced pathogen level of Step C).

13. The process of claim 1, further comprising chilling the solubilized liquid protein solution with the reduced pathogen level of step C) to an intermediate temperature to obtain a chilled liquid protein solution.

14. The process of claim 5 wherein the pH of the dewatered protein precipitate is adjusted to a range between about 6.5 to about 8.0.

15. The process of claim 5, wherein spray drying the dewatered protein precipitate.

16. The process of claim 1 further comprising centrifuging the solubilized liquid protein solution.

17. The process of claim 2 further comprising centrifuging the protein precipitate.

18. The process or claim 1 further comprising spray-drying the solubilized liquid protein solution.

19. The process of claim 1, further comprising vacuum tumbling the protein.

20. The process of claim 1, wherein when the solubilized liquid protein solution of step C) is precipitated, the functionality of the precipitated protein is determined from a measurement selected from the group consisting of: water binding test, meat emulsion test, moisture retention test and a combination thereof.

21. The process of claim 1, wherein when the protein from the solubilized liquid protein solution of step C) is precipitated, the precipitated protein has moisture that is about the same or about 1% to about 5% greater, as compared to animal muscle tissue that does not undergo the Steps of the process.

22. The protein product of claim 6, further comprising chilling the solubilized liquid protein solution with the reduced pathogen level of step C) to an intermediate temperature to obtain a chilled liquid protein solution.

23. The protein product of claim 7 further comprising dewatering the precipitated protein to a desired moisture content.

24. The protein product of claim 6 further comprising centrifuging the solubilized liquid protein solution.

25. The process of claim 7 further comprising centrifuging the protein precipitate.

26. The protein product of claim 6, further comprising vacuum tumbling the protein.

27. The protein product of claim 6, wherein when the solubilized liquid protein solution of step C) is precipitated, the functionality of the precipitated protein is determined from a measurement selected from the group consisting of: water binding test, meat emulsion test, moisture retention test and a combination thereof.

28. The protein product of claim 6, wherein when the protein from the solubilized liquid protein solution of step C) is precipitated, the precipitated protein has moisture that is about the same or about 1% to about 5% greater, as compared to animal muscle tissue that does not undergo the Steps of the process.

29. A process for producing a protein product wherein the protein product has a reduced pathogen level and retains a functionality of raw meat, wherein the protein product is obtained from animal muscle tissue, the process comprises the steps of:
- A) homogenizing the animal muscle tissue and water, to thereby obtain a homogenate;
- B) adjusting the pH of the homogenate of step A) to a range between 3.6 to 4.2 to obtain a solubilized liquid protein solution; and
- C) elevating the temperature of the solubilized liquid protein solution of step B) to an 158° F. or above for at least an instant, or to an internal temperature of about 130° F. and about 157° F. for at least between about 14 seconds to about 121 minutes to obtain a solubilized liquid protein solution with a reduced pathogen level, wherein the reduced pathogen level comprises at least a reduction in salmonella by 6.5 $\log_{10}$;
- D) centrifuging solubilized liquid protein solution with a reduced pathogen level from Step C) to form a solubilized liquid protein solution phase and a lipid phase;
- E) chilling the solubilized liquid protein solution phase with the reduced pathogen level of step C) to an intermediate temperature to obtain a chilled liquid protein solution;
- F) precipitating the protein from the chilled liquid protein solution of step D) to obtain a precipitated protein; and
- G) spray drying precipitated protein;
    - wherein the precipitated protein has the reduced pathogen level as compared to a precipitated protein that has not undergone step C) and wherein the precipitated protein retains the functionality of raw meat.

30. The process of claim 29, further comprising vacuum tumbling the precipitated protein.

31. A protein product having a reduced pathogen level and retaining a functionality of raw meat, wherein the protein product is from animal muscle tissue and is obtained from a process comprising the steps of:
- A) homogenizing the animal muscle tissue and water, to thereby obtain a homogenate;
- B) adjusting the pH of the homogenate of step A) to a range between 3.6 to 4.2 to obtain a solubilized liquid protein solution; and
- C) elevating the temperature of the solubilized liquid protein solution of step B) to 158° F. or above for at least an instant, or to an internal temperature of about 130° F. and about 157° F. for at least between about 14 seconds to about 121 minutes to obtain a solubilized liquid protein solution with a reduced pathogen level, wherein the reduced pathogen level comprises at least a reduction in salmonella by 6.5 $\log_{10}$;
- D) centrifuging solubilized liquid protein solution with a reduced pathogen level from Step C) to form a solubilized liquid protein solution phase and a lipid phase;
- E) chilling the solubilized liquid protein solution phase with the reduced pathogen level of step C) to an intermediate temperature to obtain a chilled liquid protein solution;
- F) precipitating the protein from the chilled liquid protein solution of step D) to obtain a precipitated protein; and
- G) spray drying precipitated protein;
    - wherein the precipitated protein has the reduced pathogen level as compared to a precipitated protein that has not undergone step C) and wherein the precipitated protein retains the functionality of raw meat.

32. The protein product of claim 31, further comprising vacuum tumbling the precipitated protein.

33. A process for producing a protein product wherein the protein product has a reduced pathogen level and retains a functionality of raw meat, wherein the protein product is obtained from animal muscle tissue, the process comprises the steps of:
- A) homogenizing the animal muscle tissue and water, to thereby obtain a homogenate;
- B) adjusting the pH of the homogenate of step A) to a range between 3.6 to 4.2 to obtain a solubilized liquid protein solution; and
- C) elevating the temperature of the solubilized liquid protein solution of step B) to 158° F. or above for at least an instant, or to an internal temperature of about 130° F. and about 157° F. for at least between about 14 seconds to about 121 minutes to obtain a solubilized liquid protein solution with a reduced pathogen level, wherein the reduced pathogen level comprises at least a reduction in salmonella by 6.5 $\log_{10}$;
- D) centrifuging solubilized liquid protein solution with a reduced pathogen level from Step C) to form a solubilized liquid protein solution phase and a lipid phase; and
- G) spray drying solubilized liquid protein solution phase from Step D);
    - wherein the solubilized liquid protein has the reduced pathogen level as compared to a solubilized liquid protein that has not undergone step C) and wherein the solubilized liquid protein retains the functionality of raw meat.

34. The process of claim 33, further comprising chilling the solubilized liquid protein solution phase with the reduced pathogen level of step C) to an intermediate temperature to obtain a chilled liquid protein solution.

35. A protein product having a reduced pathogen level and retaining a functionality of raw meat, wherein the protein product is from animal muscle tissue and is obtained from a process comprising the steps of:
- A) homogenizing the animal muscle tissue and water, to thereby obtain a homogenate;
- B) adjusting the pH of the homogenate of step A) to a range between 3.6 to 4.2 to obtain a solubilized liquid protein solution; and
- C) elevating the temperature of the solubilized liquid protein solution of step B) to 158° F. or above for at least an instant, or to an internal temperature of about 130° F. and about 157° F. for at least between about 14 seconds to about 121 minutes to obtain a solubilized liquid protein solution with a reduced pathogen level, wherein the reduced pathogen level comprises at least a reduction in salmonella by 6.5 $\log_{10}$;
- D) centrifuging solubilized liquid protein solution with a reduced pathogen level from Step C) to form a solubilized liquid protein solution phase and a lipid phase; and
- G) spray drying solubilized liquid protein solution phase from Step D);
    - wherein the solubilized liquid protein has the reduced pathogen level as compared to a solubilized liquid protein that has not undergone step C) and wherein the solubilized liquid protein retains the functionality of raw meat.

36. The protein product of claim 33, further comprising chilling the solubilized liquid protein solution phase with the reduced pathogen level of step C) to an intermediate temperature to obtain a chilled liquid protein solution.

\* \* \* \* \*